Aug. 16, 1932.  J. E. REGAN  1,872,006
DISK DEFLECTOR
Filed Sept. 17, 1930  2 Sheets-Sheet 1
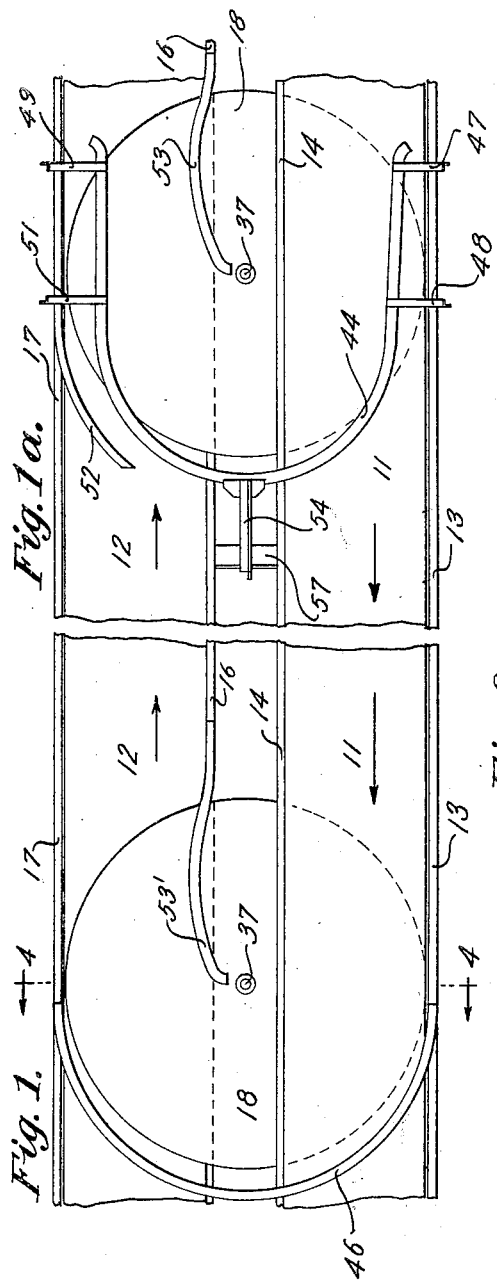
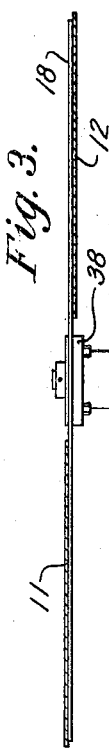
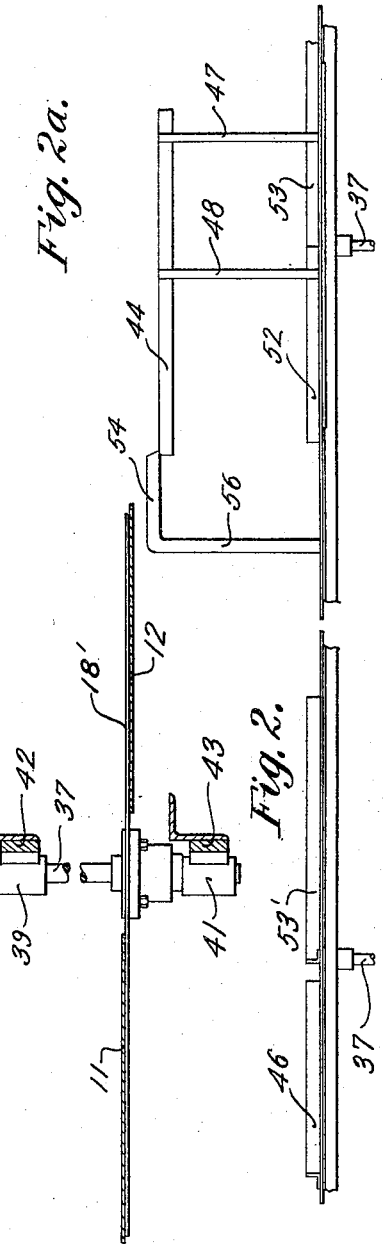
Inventor:
John E. Regan
by Roberts Cushman Woodberg
Att'ys.

Aug. 16, 1932.    J. E. REGAN    1,872,006
DISK DEFLECTOR
Filed Sept. 17, 1930    2 Sheets-Sheet 2

Inventor
John E. Regan.
by Roberts Cushman Woodberg
Atty's.

Patented Aug. 16, 1932

1,872,006

UNITED STATES PATENT OFFICE

JOHN E. REGAN, OF SYRACUSE, NEW YORK, ASSIGNOR TO THE LAMSON COMPANY, OF SYRACUSE, NEW YORK, A CORPORATION OF MASSACHUSETTS

DISK DEFLECTOR

Application filed September 17, 1930. Serial No. 482,637.

This invention relates to conveyor systems and to means for removing articles from one conveyor or station and/or transferring or delivering such articles to another conveyor. The invention resides in the method as well as in the apparatus employed and also in the construction and relative arrangement of parts of the apparatus.

As conveyor systems frequently are arranged to carry material along various courses and/or to a number of destinations it is highly desirable that articles or the like should face in the same general direction or bear the same relative position with respect to their direction of motion throughout their travel in the system. This among other things facilitates reading or observing of labels or other indicia which may conveniently be applied only to the forward side of an article for example, or in the case of relatively small articles or material in bulk to only one side of a container in which such articles or material are disposed. Moreover it is often advantageous to convey material successively along courses which may be approximately parallel. Under these conditions if the relative arrangement of the articles is to be preserved it may be necessary to turn them substantially end for end or through an angle of approximately 180 degrees during transfer from one conveyor to another. Furthermore from a manufacturing and operating point of view, it is likewise important and advantageous to reduce the number or to eliminate, whenever possible, operating parts such as gears, shafting, motors and the like without impairing the efficiency or rendering parts inaccessible for inspection or repair; and thus to reduce not only the first cost of an installation of this kind, but also the cost of maintenance, repairs and like charges.

Objects of the present invention are to improve the art of conveying material so as to facilitate the handling and transfer thereof from one conveyor or station to another; to improve the efficiency of installations of this general character in a manner to expedite and simplify the construction and operation of such systems; to provide transfer apparatus which may be readily embodied in a system of the class described and operated directly from one or more of the conveyors without the use of intermediate or auxiliary parts such as motors, gears, shafting and the like; to provide apparatus of this kind of strong durable construction consisting of few parts which are relatively simple and inexpensive to manufacture; and also to provide apparatus of the class described having an improved construction and arrangement of parts.

In the drawings:

Figs. 1 and 1ª are top plan views of conveyor systems equipped with two forms of the transfer device;

Figs. 2 and 2ª are side elevations showing only the arrangement of the deflectors and guides shown in Figs. 1 and 1ª;

Fig. 3 is an enlarged side elevation of the upper and lower deflector disks shown in Figs. 1 and 1ª;

Figure 4:
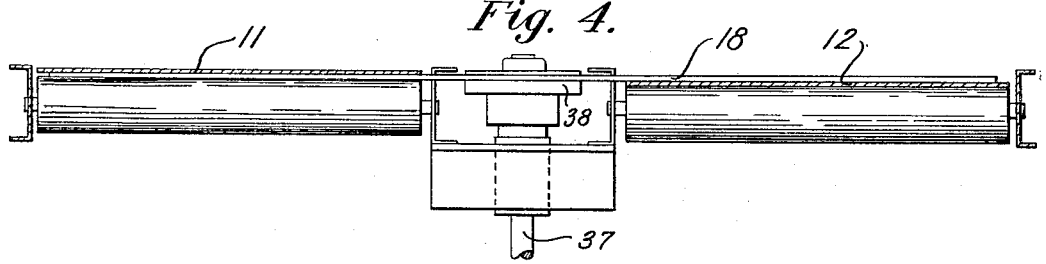
Fig. 4 is a section taken substantially along the line 4—4 of Fig. 1 showing the arrangement of a deflector disk with respect to the conveyors.

In the apparatus selected for illustration the travelling surfaces which convey material to the desired stations or points of transfer are in the form of laterally spaced conveyor belts 11 and 12. While only the upper runs of these belts are shown in Figs. 1 and 1ª and are herein considered it will be understood that the lower or return runs of the belts are disposed directly below the upper runs and may cooperate with other portions of the apparatus in the same manner as do the upper runs. These belts are provided with side frames 13, 14, 16 and 17 which may be in the form of channels or other suitable members as is usual in installations of this kind. The upper runs of the belts are disposed at approximately the same level with the upper run of one belt for example the belt 11 (Fig. 4) disposed slightly above the other.

For transferring the material from the upper run of the belt 11 to the upper run of the belt 12 there is provided a rotary disk 18 mounted upon a vertical axis between the belts with the upper surface of the disk extending beneath the upper run of the belt 11 and substantially coplanar with the lower surface of this run. In a similar manner the lower surface of the disk 18 is disposed above and substantially coplanar with the upper surface of the belt 12. As will be more apparent on consideration of Figs. 5 and 6 this disk is pressed or held in frictional engagement with the lower surface of the belt 11 by the transversely disposed idler rollers 21, 22, 23 in Fig. 5 and by the rollers 24, 26 and 27 in Fig. 6. If desired, these rollers may be inclined slightly to provide proper contact between the disk and the belt. As the corresponding run of the belt 12 extends beneath the disk 18 the idler rollers 28, 29 and 31 in Fig. 5 and 32, 33 and 34 in Fig. 6 engage the belt directly and thus serve to press or maintain the latter in frictional engagement with the under surface of the disk 18. Other idler rollers 36 may be provided as usual for supporting the belts and for maintaining the latter taut and in the proper position.

In order to eliminate as far as possible the number of operating parts and yet to provide an efficient and durable construction, each disk 18 is rigidly mounted upon vertical shaft 37 (Fig. 3) by means of a connection 38 of any approved type. The shafts 37 are rotatably mounted in upper and lower radial bearings 39 and 41, which are carried by fixed supports 42 and 43.

Figure 6:
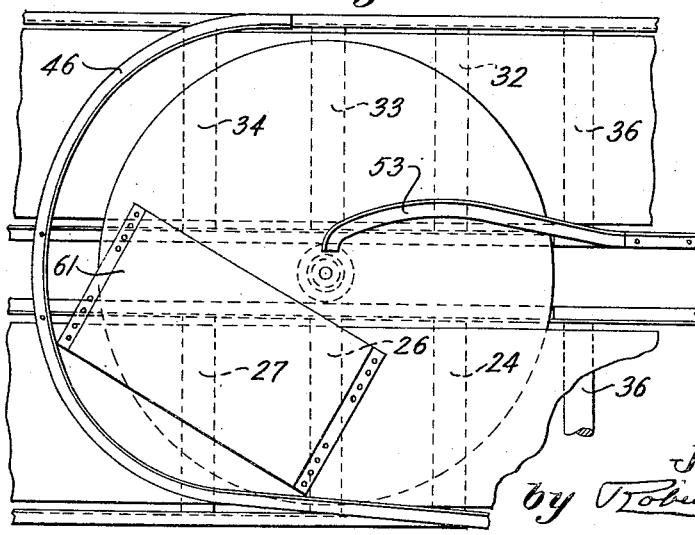
Fig. 6 is an enlarged top plan view of the transfer station shown in Fig. 1.

The transfer station shown in Figs. 1ª, 2ª, and 5 is equipped with high deflector 44 while the station shown in Figs. 1, 2 and 6 is provided with a low deflector 46. The deflector 44 is in the form of an angle which is curved from a direction approximately parallel to the direction of motion of the belt 11 to that of the belt 12 as indicated by the arrows in Fig. 1ª. Fixed supports 47, 48, 49 and 51, which may be carried by the outer side frames 13 and 17, support the deflector 44 at a predetermined height above the travelling surfaces of the belts 11 and 12. A guide rail 52 may also be secured to the side frame 17 and curved inwardly to a point preferably outside the deflector 44. An inner guide rail 53 is attached to the inner side frame 16 of the belt 12 and is curved outwardly toward the belt and then toward the center or axis of rotation of the associated disk 18. The central or intermediate portion of deflector 44 is supported at a point between the belts 11 and 12 by a bracket 54 mounted upon an upright 56 which is supported upon a transverse plate 57, the latter resting on and being attached to the adjacent side frames 14 and 16.

The deflector guide 46 is in the form of an angle bent to a semi-circular contour with the outer ends thereof attached to the side frames 13 and 17 respectively. This guide is disposed closely adjacent to travelling surfaces of the belts 11 and 12. This transfer station is provided with an inner guide rail 53′ which is arranged in substantially the same manner as the guide rail 53 shown in Fig. 5.

Figure 5:
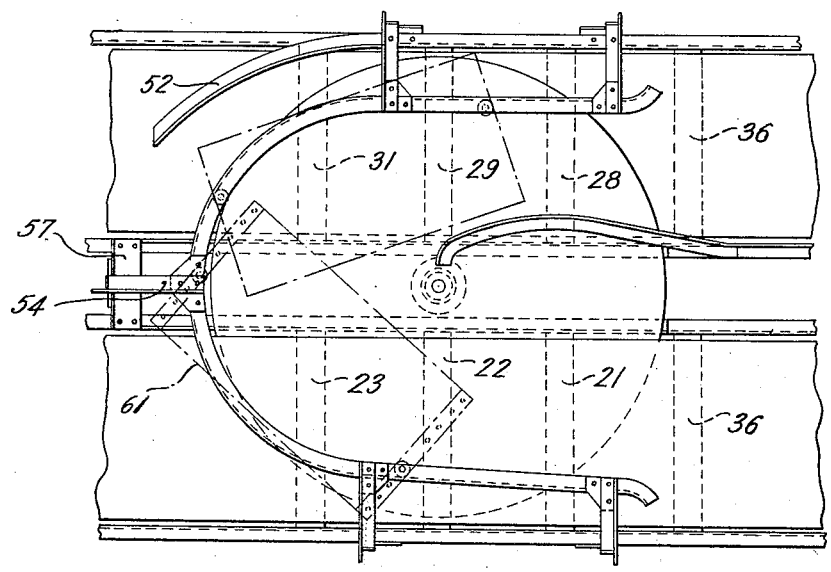
Fig. 5 is an enlarged top plan view of the transfer station shown in Fig. 1ª.
Figure 7:
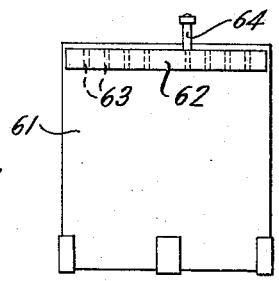
Fig. 7 is an end elevation of a container which may be used with systems of the class described.

The container 61 shown in Fig. 7 is particularly well adapted to be used in transfer stations of the type shown in Fig. 5 and comprises a rectangular body portion having transverse strips 62 disposed across the upper ends thereof. Each of these strips is provided with a series of recesses 63 arranged preferably in a row and adapted detachably to receive a pin such as the pin 64. When this pin is disposed in any of these recesses it projects above the body of the container a sufficient distance to engage the deflector 44, for example.

In the operation of the apparatus the rotary disks 18 which may be made of leather or other suitable material are set in rotation by frictional engagement with the runs of the belt of which they are associated. As the shafts 37 are free to move longitudinally in their bearings 39 and 41 it will be seen that these disks may have sufficient axial movement to assure proper engagement with the belts. When a container 61 of the type shown in Fig. 7 is disposed upon the belt 11, of Fig. 1ª for example, the pin 64 will engage the deflector guide 44 as the container approaches this guide. This deflector is so shaped that the pin will be moved transversely with respect to direction of motion of the conveyor belt 11 and cause the container 61 to move gradually off of this belt and on to the rotating disk 18 at a point adjacent the center or axis of rotation thereof. The increasing curvature of the deflector 44 then becomes effective to move the pin 64 further towards the disk 18. Preferably one of these pins is disposed in a recess in each end of the container 61 as will be apparent from a consideration of Fig. 5. Both of these pins then eventually engage the high deflector guide 44 and act as pivots about which the container 61 is turned as it is moved from the belt 11 on to the rotary disk 18. As this container is moved from a position in close proximity to the center of the disk toward the outer periphery thereof it is progressively subjected to increasing rotational speeds of the disk by being moved across the latter to positions at a greater radius from the axis of rotation. This movement assists in turning the container 61 and in swinging the latter partially around on the disk. Moreover it will be seen that the pins 64 in each end of the container act as pivots about which the disk is turned during transfer. As these pins ride against the deflector guide 44 it will also be seen that the axes about which each container turns as it travels from one conveyor to the other pass over substantially the same course. After a container has moved to the position indicated in dot and dash lines in Fig. 5 it is further guided by the guide members 52 and 53 and the rotational speed of the disk is effective to discharge the container onto the belt 12 in the direction of motion thereof with the container turned substantially end for end or through the angle of approximately 180°.

The deflector 46, of the type shown in Fig. 6 is so low that it engages the body itself of a container such as a container 61 or other article and guides the latter onto the disk 18 and then in cooperation with the central guide 53 onto the belt 12 in substantially the same manner as that described with reference to Fig. 5.

While only two deflectors, one of each type, are provided in the illustrated system it will be understood that a plurality of deflector guides 44 may be provided along the course of travel of the belts such guides increasing in width so that the first guide will be engaged by pins 64 in the left hand pair of recesses 63 and the last guide will be engaged by pins 64 in the right hand pair of recesses.

Moreover the shafts 37 may carry in addition and parallel to the disks 18, disks 18′ which will cooperate with the lower runs of the belts 11 and 12 in substantially the manner above described, suitable deflector guides and associated means (not shown) being provided.

It will also be understood that the present disclosure is for the purpose of illustration only and that this invention includes all modifications and equivalents which fall within the scope of the appended claims.

I claim:

1. In a conveyor system, the combination of upper, intermediate and lower travelling surfaces, the intermediate travelling surface being rotatable and disposed in relatively close proximity to each of the other travelling surfaces extending below the upper surface and above the lower surface and in contact with and rotatable by at least one of said surfaces, means for causing an article to move from the upper travelling surface onto the intermediate travelling surface, and means for causing said article to move from the intermediate travelling surface, onto the lower travelling surface.

2. In a conveyor system, the combination of upper, intermediate and lower travelling surfaces, the intermediate travelling surface being disposed in relatively close proximity to each of the other travelling surfaces, one at least of said surfaces contacting with and thereby operating the intermediate travelling surface, and means for guiding an article from the upper travelling surface onto the intermediate travelling surface and from the latter onto the lower travelling surface.

3. In a conveyor system, the combination of upper, intermediate and lower conveyors, the intermediate conveyor being disposed in relatively close proximity to each of the other conveyors and having at least one of its surfaces in frictional engagement with the adjacent surface of one of the other conveyors to be operable thereby, and means for directing an article from the upper conveyor onto the intermediate conveyor and thence onto the lower conveyor.

4. In a conveyor system, the combination of upper and lower conveyors, an intermediate conveyor arranged to float between the upper and lower conveyors and to be in frictional driving engagement therewith, and means for directing an article from the upper conveyor onto the intermediate conveyor and thence onto the lower conveyor.

5. In a conveyor system, the combination with laterally spaced conveyors, of a rotary disk disposed therebetween, the upper surface of the disk being substantially coplanar with the adjacent under surface of one conveyor and the lower surface of the disk being substantially coplanar with the adjacent upper surface of the other conveyor, means for supporting the disk for axial movement, means for effecting driving engagement between the adjacent surfaces of the disk and at least one of the conveyors, and means for guiding an article from one conveyor onto the disk and then onto the other conveyor.

6. In a conveyor system, the combination with laterally spaced conveyors, of a rotary disk disposed therebetween, the upper surface of the disk being in frictional engagement with the adjacent lower surface of one conveyor and the lower surface of the disk being in frictional engagement with the adjacent upper surface of the other conveyor, means for guiding an article from one conveyor onto the disk at a point relatively close to the axis of rotation thereof, means for thereafter guiding the article across the disk toward the periphery thereof to subject the article to increasing rotational speeds for assisting in turing the article, means for retaining the article on the disk to a point of discharge so that the article may be turned end for end, and means for discharging the turned article from the disk to the other conveyor.

7. In a conveyor system comprising laterally spaced belts having their upper and lower runs disposed respectively at approximately the same levels, the combination of an upright shaft between the belts, vertically spaced rotary disks mounted on the shaft for limited axial movement, each disk being disposed above the adjacent surface of one belt and below the adjacent surface of the other belt, means for driving the disks directly from the belts, and means associated with each disk for guiding articles from one belt onto the disk and then onto the other belt.

8. In a conveyor system comprising laterally spaced belts having their upper and lower runs disposed respectively at approximately the same levels, the combination of an upright shaft between the belts, vertically spaced rotary disks mounted on the shaft for limited axial movement, each disk being disposed above the adjacent surface of one belt and below the adjacent surface of the other belt, means associated with each belt for supporting the latter in frictional driving engagement with one of the disks, and means for guiding articles from one belt onto a disk and then onto the other belt.

Signed by me at Syracuse, New York, this 6th day of September, 1930.

JOHN E. REGAN.